(12) United States Patent
van Stiphoudt et al.

(10) Patent No.: US 9,873,785 B2
(45) Date of Patent: Jan. 23, 2018

(54) PRODUCTION METHOD FOR WATER-SOLUBLE POLYMERS

(71) Applicant: EVONIK DEGUSSA GMBH, Essen (DE)

(72) Inventors: Manfred van Stiphoudt, Kempen (DE); Udo Klapperich, Leubsdorf/Rhein (DE); Theodor Malinowski, Wachtendonk (DE)

(73) Assignee: Evonik Degussa GmbH, Essen (DE)

(*) Notice: Subject to any disclaimer, the term of this patent is extended or adjusted under 35 U.S.C. 154(b) by 16 days.

(21) Appl. No.: 14/877,100

(22) Filed: Oct. 7, 2015

(65) Prior Publication Data
US 2016/0108226 A1  Apr. 21, 2016

Related U.S. Application Data

(60) Provisional application No. 62/064,524, filed on Oct. 16, 2014.

(30) Foreign Application Priority Data

Oct. 16, 2014 (EP) .................................. 14189166

(51) Int. Cl.
*C08L 33/02* (2006.01)

(52) U.S. Cl.
CPC ........... *C08L 33/02* (2013.01); *C08L 2201/54* (2013.01); *C08L 2312/00* (2013.01)

(58) Field of Classification Search
CPC .............................. C08L 33/02; C08L 2312/00
USPC .......................................... 523/333; 524/556
See application file for complete search history.

(56) References Cited

U.S. PATENT DOCUMENTS

| | | | |
|---|---|---|---|
| 4,666,983 A | 5/1987 | Tsubakimoto et al. |
| 4,734,478 A | 3/1988 | Tsubakimoto et al. |
| 5,004,761 A | 4/1991 | Yada et al. |
| 5,331,059 A | 7/1994 | Engelhardt et al. |
| 5,837,789 A | 11/1998 | Stockhausen et al. |
| 6,143,821 A | 11/2000 | Houben |
| 6,239,230 B1 | 5/2001 | Eckert |
| 6,241,928 B1 | 6/2001 | Hatsuda et al. |
| 6,503,979 B1 | 1/2003 | Funk et al. |
| 6,559,239 B1 | 5/2003 | Riegel et al. |
| 6,657,015 B1 | 12/2003 | Riegel et al. |
| 6,710,141 B1 | 3/2004 | Heide et al. |
| 6,939,991 B2 | 9/2005 | Thiel et al. |
| 7,183,360 B2 | 2/2007 | Daniel et al. |
| 7,199,211 B2 | 4/2007 | Popp et al. |
| 7,250,481 B2 | 7/2007 | Jaworek et al. |
| 7,259,212 B2 | 8/2007 | Popp et al. |
| 7,285,599 B2 | 10/2007 | Mertens et al. |
| 7,405,321 B2 | 7/2008 | Riegel et al. |
| 7,420,013 B2 | 9/2008 | Riegel et al. |
| 7,541,395 B2 | 6/2009 | Reimann et al. |
| 7,557,245 B2 | 7/2009 | Nordhoff et al. |
| 7,572,864 B2 | 8/2009 | Mertens et al. |
| 7,652,111 B2 | 1/2010 | Hermeling et al. |
| 7,687,596 B2 | 3/2010 | Hermeling et al. |
| 7,754,822 B2 | 7/2010 | Daniel et al. |
| 7,772,420 B2 | 8/2010 | Hermeling et al. |
| 7,803,969 B2 | 9/2010 | Nordhoff et al. |
| 7,964,689 B2 | 6/2011 | Nordhoff et al. |
| 7,981,969 B2 | 7/2011 | Riegel et al. |
| 8,013,087 B2 | 9/2011 | Loesch et al. |
| 8,183,331 B2 | 5/2012 | Loesch et al. |
| 8,258,223 B2 | 9/2012 | Riegel et al. |
| 8,349,913 B2 | 1/2013 | Harren et al. |
| 2004/0186229 A1 | 9/2004 | Heide et al. |
| 2005/0165208 A1 | 7/2005 | Popp et al. |
| 2006/0212011 A1 | 9/2006 | Popp et al. |
| 2012/0196987 A1 | 8/2012 | Funk et al. |
| 2012/0302445 A1 | 11/2012 | Rudolph et al. |
| 2014/0377538 A1 | 12/2014 | Vorholt et al. |
| 2015/0210843 A1 | 7/2015 | Kimura et al. |

FOREIGN PATENT DOCUMENTS

| | | |
|---|---|---|
| DE | 3314019 A1 | 1/1984 |
| DE | 3523617 A1 | 1/1986 |
| DE | 3713601 A1 | 11/1988 |
| DE | 3825366 A1 | 2/1989 |
| DE | 19630131 A1 | 3/1997 |
| DE | 19543368 A1 | 5/1997 |
| DE | 19646484 A1 | 5/1997 |
| DE | 19807992 C1 | 7/1999 |
| DE | 19807502 A1 | 9/1999 |
| DE | 19854573 A1 | 5/2000 |
| DE | 19854574 A1 | 5/2000 |
| DE | 10204937 A1 | 8/2003 |

(Continued)

OTHER PUBLICATIONS

DE 19630131 machine translation original document (1997).*
German language European Search Report dated Apr. 17, 2015 in EP 14 18 9166 (5 pages).
Wagner et al., U.S. Appl. No. 14/861,526, filed Sep. 23, 2015.

*Primary Examiner* — Edward Cain
(74) *Attorney, Agent, or Firm* — Bernard Lau; Linda S. Li; Jason S. Ngui

(57) ABSTRACT

Described is a process for producing water-absorbing polymers wherein a base polymer A is contacted and mixed with an aqueous additive solution B in a mixing device, wherein the base polymer A is formed from monomers bearing at least 30% neutralized acid groups and the aqueous additive solution B is dosed into the mixing device without nozzle via a pipe.

14 Claims, No Drawings

(56) References Cited

FOREIGN PATENT DOCUMENTS

| | | |
|---|---|---|
| DE | 10204938 A1 | 8/2003 |
| DE | 10331450 A1 | 1/2005 |
| DE | 10331456 A1 | 2/2005 |
| DE | 10334584 A1 | 2/2005 |
| DE | 10355401 A1 | 6/2005 |
| EP | 0083022 A2 | 7/1983 |
| EP | 0450922 A2 | 10/1991 |
| EP | 0530438 A1 | 3/1993 |
| EP | 0543303 A1 | 5/1993 |
| EP | 0547847 A1 | 6/1993 |
| EP | 0559476 A1 | 9/1993 |
| EP | 0632068 A1 | 1/1995 |
| EP | 0937736 A2 | 8/1999 |
| EP | 1199327 A2 | 4/2002 |
| WO | 90/15830 A1 | 12/1990 |
| WO | 93/21237 A1 | 10/1993 |
| WO | 2001/038402 A1 | 5/2001 |
| WO | 02/22717 A1 | 3/2002 |
| WO | 2002/032962 A2 | 4/2002 |
| WO | 2002/055469 A1 | 7/2002 |
| WO | 2003/031482 A1 | 4/2003 |
| WO | 2003/078378 A1 | 9/2003 |
| WO | 2003/104299 A1 | 12/2003 |
| WO | 2003/104300 A1 | 12/2003 |
| WO | 2003/104301 A1 | 12/2003 |
| WO | 2004/035514 A1 | 4/2004 |
| WO | 2005/080479 A1 | 9/2005 |
| WO | 2008/040715 A2 | 4/2008 |
| WO | 2008/052971 A1 | 5/2008 |
| WO | 2011/042468 A2 | 4/2011 |
| WO | 2014/041969 A1 | 3/2014 |

* cited by examiner

PRODUCTION METHOD FOR WATER-SOLUBLE POLYMERS

This application claims the benefit of U.S. Provisional Application No. 62/064,524 filed on Oct. 16, 2014 and European Application No. 14189166.3 filed on Oct. 16, 2014, the disclosures of which are expressly incorporated herein by reference.

FIELD

The present invention resides in the field of superabsorbents and water-absorbing polymeric particles. The present invention relates particularly to a process for producing water-absorbing polymeric particles. The present invention further concerns water-absorbing polymeric particles and also hygiene articles comprising water-absorbing polymeric particles.

BACKGROUND

Superabsorbents are known, the term designating crosslinked hydrophilic polymers capable of imbibing large amounts of aqueous fluids. This capability rests on the strong interaction of water with hydrophilic groups on the superabsorbents, in particular ionic groups or groups capable of hydrogen bonding. Other customary designations for what are known as superabsorbents include "superabsorbent polymer", "hydrogel" (often even used for the dry form), "hydrogel-forming polymer", "water-absorbing polymer", "absorbent gel-forming material", "swellable resin", "water-absorbing resin" or the like. Water-absorbing polymers based on partially neutralized acrylic acid are concerned in particular. The essential properties of superabsorbents are their ability to absorb a multiple (30-800 times for example) of their own weight of aqueous fluids and to retain the fluid even under some pressure. The superabsorbent, which is used in the form of a dry powder, turns into a gel on imbibing liquid and so turns into a hydrogel when as usual imbibing water. Crosslinking is essential for synthetic superabsorbents and renders the polymers insoluble in water. Soluble substances would not be useful as superabsorbents. By far the most important field of use for superabsorbents is that of absorbing bodily fluids. Superabsorbents are used, for example, in diapers for infants, incontinence products for adults or femcare products. Fields of use further include, for example, as a water-retaining agent in market gardening, as a water store for protection against fire, for fluid absorption in food packaging, as cable cladding material for deep sea cables or, very generally, for absorption of moisture.

Such a superabsorbent in general has a CRC ("Centrifuge Retention Capacity") of at least 5 g/g, preferably at least 10 g/g, more preferably at least 20 g/g, especially 30 g/g. It is not just its absorption capacity which is important for a superabsorbent, but also its ability to retain liquid under pressure, usually expressed as "Absorption against Pressure" ("AAP") and also its permeability, i.e. the ability to conduct liquid in the swollen state. Flow conductivity to as yet unswollen superabsorbent may be blocked by swollen gel ("gel blocking"). Good conductivity properties for liquids are shown, for example, by hydrogels that have a high level of gel strength in the swollen state. Gels having only low gel strength are deformable under an applied pressure (body pressure), cause pores to collapse in a superabsorbent/cellulose fiber pad and thereby block flow conductivity to as yet unswollen or incompletely swollen superabsorbent and the imbibition of liquid by this, as yet unswollen or incompletely swollen superabsorbent. Elevated gel strength is generally achieved through a relatively high level of crosslinking, but this reduces the absorption capacity of the product. An effective method of increasing gel strength is to increase the level of crosslinking at the surface of the superabsorbent particles compared to the interior of the particles. To this end, superabsorbent particles which have usually been dried and have an average crosslink density are subjected to additional crosslinking in a thin surface layer of the particles thereof. Surface postcrosslinking increases the crosslink density in the shell of the superabsorbent particles, raising the absorption under confining pressure to a higher level. While the absorption capacity in the surface layer of the superabsorbent particles decreases, the presence of mobile chains of polymer in their core leads to an improved absorption capacity compared with the shell, so shell construction ensures an improved permeability without occurrence of gel blocking. It is likewise known to produce comparatively highly crosslinked superabsorbent overall and to subsequently reduce the degree of crosslinking in the interior of the particles versus an outer shell of the particles.

The manufacture of such superabsorbents (or superabsorbent polymers) is based essentially on the polymerization of ethylenically unsaturated acid-functional monomers which are optionally at least partly present as a salt, in particular on the free-radical polymerization of partially neutralized acrylic acid, typically in the presence of crosslinkers.

When additive treatment of the polymer is required during the production of such superabsorbents, for which it is customary to use liquid preparations of the additives to be added, in particular aqueous solutions of additive. These liquid preparations, in particular solutions, of additives are typically applied to the polymer by nozzle spraying in order to obtain a particularly good distribution. Nozzle plugging in particular is one of the frequent issues here ranging from loss of product quality to costly and inconvenient maintenance being required to production outages. Heatable nozzles etc. are therefore used for example.

The problem addressed by the present invention against this background was specifically that of improving in the manufacture of water-absorbing polymeric particles the manner of adding liquid additive preparations to the effect that issues ranging from loss of product quality to production outages due to the admixture of additive become better avoidable.

It was found that, surprisingly, this problem is solved by the subject matter of the invention, namely. a process for producing water-absorbing polymers wherein a base polymer A is contacted and mixed with a liquid additive preparation B, in particular an aqueous additive solution B, in a mixing device, wherein the base polymer A is formed from monomers bearing at least 30%, preferably at least 40%, neutralized acid groups and the liquid additive preparation B, in particular the aqueous additive solution B, is dosed into the mixing device without nozzle via a pipe.

This process makes possible an essentially trouble- and maintenance-free admixture of liquid additive preparations in the manufacture of water-absorbing polymeric particles. Surprisingly, product quality is not compromised despite the eschewal of nozzles for spray dispensing the liquid additive preparations. Production outages become avoidable.

Further advantages of the invention are that maintenance requirements are very significantly reducible overall since, for example, there is much less fouling and hence cleaning requirements are appreciably reduced. Reduced residence time in the mixer is also made possible. Aerosol formation is avoided. Mixers can be used more efficiently. All this results in a distinct reduction in manufacturing costs.

SUMMARY

The invention provides a simple and unproblematic way of employing even incompatible or mutually immiscible liquids. This prevents any possible separation of liquid additive preparation B, since it is only formed in the process itself and is immediately further processed. The invention provides a simple and unproblematic way to employ very concentrated liquids which have a high additive content. This has the advantage that less water or solvent has to be removed later, making it possible to reduce energy costs.

By liquid additive preparation B are meant liquids in the widest sense, in particular solutions, emulsions, sols, suspensions, slurries. Liquid additive preparation B is in particular an aqueous additive solution.

Aqueous additive solution, in particular aqueous additive solution B, hereinbelow comprehends any liquid additive preparation containing at least 5% by weight of water, based on its overall weight. Aqueous additive solution herein thus also comprehends emulsions, sols, suspensions and also slurries. Liquid additive preparation B may most simply comprise water only, but in particular it contains at least one additive as well as water.

The term "pipe" is known per se and does not require further elucidation. A pipe, as will be known, is an elongate hollow body whose length is generally significantly greater than its diameter. Pipes, as will be known, may be used to transport liquids. Pipes may be fabricated from a very wide variety of construction materials, for example steel, ceramics or plastic, and are generally inflexible. Stainless steel is particularly preferable. Pipe connections may be threaded, soldered, brazed, welded, adhered, tucked into each other with a gasket, clamped with a tension ring, merely push or press fitted. Possible means of connection include welded and soldered and brazed seams, flanges, sleeves, pipe-connecting elements, rolling, tensioning rings, moldings, threaded unions and also pre-bent pieces of pipe. Typical moldings are T pieces, 45°, 90° and 180° arcs and also concentric and eccentric reductions. All this is known and available to a person skilled in the art.

Nozzles are likewise known to a person skilled in the art. Prior art application of additive solutions to superabsorbent particles is in principle by spraying. Nozzles are needed for this. The term "nozzle" for the purposes of the present invention comprehends in particular any type of spray nozzles and atomization systems, e.g. mono and polydisperse spraying systems, one-material pressurized nozzles (jet or lamellae-forming), rotary atomizers, two-material atomizers, ultrasound atomizers, impingement nozzles, round jet, flat jet, wide angle round beam nozzles, slot nozzles, full cone nozzles, and so on.

Mixing devices are likewise known to a person skilled in the art. Numerous mixing devices are recited in the prior art as useful in the manufacture of superabsorbent particles. The familiar mixing devices are useful for the purposes of this invention. Mixers having moving mixing implements, such as screw mixers, disk mixers and paddle mixers, can be used for example. Particular preference is given to horizontal mixers, such as paddle mixers. Vertical mixers are likewise preferable. The distinction between horizontal mixers and vertical mixers is made by the position of the mixing shaft, i.e. horizontal mixers have a horizontally mounted mixing shaft and vertical mixers have a vertically mounted mixing shaft. Suitable mixers are, for example, horizontal Pflug-schar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). It is also possible to use fluidized bed or moving bed reactors as a mixing device.

DETAILED DESCRIPTION

The present invention eschews using a nozzle to apply the liquid additive preparation B to the base polymer A, and so the liquid additive preparation B is thus herein not applied by spraying but is introduced into the mixing device without nozzle via a pipe.

The process of the present invention as embodied in the context of a preferred embodiment of this invention comprises particularly a process for producing water-absorbing polymeric particles by polymerizing a monomer solution or suspension comprising
a) at least one ethylenically unsaturated acid-functional monomer which is optionally at least partly present in the form of a salt,
b) at least one crosslinker,
c) at least one initiator,
d) optionally one or more ethylenically unsaturated monomers copolymerizable with the monomers recited under a),
e) optionally one or more water-soluble polymers,
f) water,
g) optionally additives and/or active substances,
wherein the process further comprises
(i) drying the polymer obtained and also
(ii) optionally grinding the dried polymer and sieving the ground polymer and also
(iii) optionally surface-postcrosslinking the dried and possibly ground and sieved polymer,
(iv) and also further optionally posttreating the possibly surface-postcrosslinked polymer with at least one post-treating agent.

Admixing a liquid additive preparation B, in particular an aqueous additive solution B, to a base polymer A in the manner of the present invention may be done two or more and/or at different times in the context of producing the water-absorbing polymeric particles.

Admixing the liquid additive preparation B, in particular the aqueous additive solution, in the manner of the present invention may herein be preferable to the polymer corresponding to base polymer A before the surface-postcrosslinking step, in particular before surface-postcrosslinking step (III), particularly for the purposes of surface postcrosslinking, and/or the liquid additive preparation B, in particular the aqueous additive solution, may preferably be admixed to the already surface-postcrosslinked polymer, particularly for the purposes of posttreatment.

The polymer whereto in each case a liquid additive preparation B, in particular an aqueous additive solution B, is admixed in accordance with this invention without nozzle via a pipe, is herein referred to as base polymer A. The base polymer A may preferably be an already surface-postcrosslinked polymer, to be designated as base polymer A" for example, but it may preferably also be a still to be surface-postcrosslinked polymer, to be referred to as base polymer A' for example. This base polymer A is in either case situated in particular in a mixing device, for example a vertical or a horizontal mixer, at the time of admixture of liquid additive preparation B.

It amounts to a preferred embodiment of the invention when, in the process of the present invention, the monomer to be polymerized, in particular monomer a), is acrylic acid which is at least partly present as sodium acrylate. Useful monomers will be described more particularly hereinbelow.

In principle, the customary crosslinkers and crosslinker quantities can be used in the polymerization in the context of the present invention. This will be more particularly discussed hereinbelow. However, it amounts to a preferred embodiment of the invention for the monomer solution or suspension to be polymerized to comprise at least 0.01% by weight of crosslinker, in particular crosslinker b), based on unneutralized monomer, in particular on unneutralized monomer a).

It is further in accordance with a very particularly preferred embodiment of the invention for a surface-postcrosslinking operation to be carried out as part of the process according to the present invention. This surface-postcrosslinking operation is carried out in particular by using a liquid additive preparation B, in particular an aqueous additive solution B, which is applied to the base polymer A, for example base polymer A', by being introduced into the mixing device via a pipe without nozzle. This too will be more particularly described hereinbelow.

It is further preferable for the preferably surface-postcrosslinked polymer, for example base polymer A", to be subjected to a further treatment, preferably a surface treatment, advantageously by admixing at least one posttreating agent, in particular by employing a liquid additive preparation B, in particular an aqueous additive solution B, for example an aqueous additive solution B'. This corresponds to a posttreatment of the possibly surface-postcrosslinked polymer, preferably with at least one posttreating agent. Suitable posttreating agents are, in particular, substances that are added to the polymer in order to change its properties in a desired direction and/or to facilitate its processability. A person skilled in the art is well aware of suitable posttreating agents from the field of superabsorbent technology. They include, for example, anti-dust agents, for example polyols and/or polyalkylene glycols, anti-caking agents, for example Sipernates, Aerosils, cationic surfactants, e.g. quaternary ammonium or phosphonium salts, odor control agents, e.g., zeolites, bentonites, silica, cyclodextrins, scents, antimicrobial actives or oxidizing agents.

In principle, the process of the present invention can be implemented entirely without problems in all customary processes for producing water-absorbing polymeric particles.

Although the manufacture of water-absorbing polymeric particles is well known per se, a particularly preferred production process will now be more particularly described because the hereinbelow described preferred embodiments lead to particularly good results as regards the attainment of the desired object.

The particularly preferred process of the present invention, as already noted, comprises the polymerization of a monomer solution or suspension comprising
 a) at least one ethylenically unsaturated acid-functional monomer which is optionally at least partly present in the form of a salt,
 b) at least one crosslinker,
 c) at least one initiator,
 d) optionally one or more ethylenically unsaturated monomers copolymerizable with the monomers recited under a),
 e) optionally one or more water-soluble polymers,
 f) water,
 g) optionally additives and/or active substances.

The monomers a) are preferably water-soluble, i.e. the solubility in water at 23° C. is typically at least 1 g/100 g of water, preferably at least 5 g/100 g of water, more preferably at least 25 g/100 g of water and most preferably at least 35 g/100 g of water. Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid. Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, an acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfural, 0.0001% by weight of maleic anhydride, 0.0003% by weight of diacrylic acid and 0.0050% by weight of hydroquinone monomethyl ether. The proportion of acrylic acid and/or salts thereof in the total amount of monomers a) is preferably at least 50 mol %, more preferably at least 90 mol %, most preferably at least 95 mol %. The monomers a) may typically comprise polymerization inhibitors, preferably hydroquinone monoethers, as storage stabilizers.

The monomer solution may comprise preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoethers, each based on the unneutralized monomer a). For example, the monomer solution can be prepared by using an ethylenically unsaturated monomer bearing acid groups with an appropriate content of hydroquinone monoether. Preferred hydroquinone monoethers are hydroquinone monomethyl ether (MEHQ) and/or alpha-tocopherol (vitamin E).

Suitable crosslinkers b) are for example compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b) are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632

068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine. Very particularly preferred crosslinkers b) are the polyethoxylated and/or -propoxylated glycerols which have been esterified with acrylic acid or methacrylic acid to give di- or triacrylates, as described, for example, in WO 2003/104301 A1.

Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably ≥0.01, preferably 0.05% to 1.5% by weight, more preferably 0.1% to 1% by weight, most preferably 0.3% to 0.6% by weight, based in each case on monomer a). With rising crosslinker content, centrifuge retention capacity (CRC) falls and the absorption under a pressure passes through a maximum.

Initiators c) used may be all compounds which generate free radicals under the polymerization conditions, for example thermal initiators, redox initiators or photoinitiators. Suitable redox initiators are for example sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methyl cellulose or hydroxyethyl cellulose, gelatin, polyglycols or polyacrylic acids, preferably starch, starch derivatives and modified cellulose.

Typically, an aqueous monomer solution can be used. The water content of the monomer solution is preferably from 20% to 75% by weight, more preferably from 30% to 70% by weight and most preferably from 40% to 65% by weight. It is also possible to use monomer suspensions, i.e. monomer solutions with excess monomer a), for example sodium acrylate. As the water content rises, the energy expenditure in the subsequent drying rises and, as the water content falls, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable additives and/or active substances for optional inclusion in the monomer solution or suspension are substances that are able to change the properties of the resultant polymers in a desired direction, that are capable of facilitating the processability thereof or that are capable of endowing the polymer with an additional function.

Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on a belt is described, for example, in DE 38 25 366 A1 and U.S. Pat. No. 6,241,928. Polymerization in a belt reactor forms a polymer gel which has to be comminuted in a further process step, for example in an extruder or kneader. However, it is also possible to dropletize an aqueous monomer solution and to polymerize the droplets obtained in a heated carrier gas stream. It is possible here to combine the process steps of polymerization and drying, as described in WO 2008/040715 A2 and WO 2008/052971 A1.

The acid groups of the resulting polymer gels have typically been partly neutralized. Neutralization is preferably carried out at the monomer stage. This is typically accomplished by mixing in the neutralizing agent as an aqueous solution or preferably also as a solid. The degree of neutralization is preferably from 25 to 85 mol %, for "acidic" polymer gels more preferably from 30 to 60 mol %, most preferably from 35 to 55 mol %, for "neutral" polymer gels more preferably from 65 to 80 mol %, most preferably from 70 to 75 mol %, and the customary neutralizing agents may be used, preferably alkali metal hydroxides, alkali metal oxides, alkali metal carbonates or alkali metal bicarbonates and also mixtures thereof. Ammonium salts such as the salt of triethanolamine can also be used instead of alkali metal salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably 10 to 30 mol % and more preferably 15 to 25 mol % of the acid groups before the polymerization by adding a portion of the neutralizing agent directly to the monomer solution and setting the desired final degree of neutralization only after the polymerization, at the polymer gel stage. When the polymer gel is at least partly neutralized after the polymerization, the polymer gel is preferably comminuted mechanically, for example by means of an extruder, in which case the neutralizing agent can be sprayed, sprinkled or poured on and then carefully mixed in. For this purpose, the gel material obtained can be extruded several times more for homogenization.

The polymer gel may then preferably be dried with a belt dryer until the residual moisture content is preferably 0.5 to 15% by weight, more preferably 1 to 10% by weight and most preferably 2 to 8% by weight, the residual moisture content being determined by EDANA (European Disposables and Nonwovens Association) recommended test method No. WSP 230.2-05 "Moisture Content".

In the case of too high a residual moisture content, the dried polymer gel may have too low a glass transition temperature $T_G$ and is then processed further only with difficulty. In the case of too low a residual moisture content, the dried polymer gel may be too brittle and, in the subsequent comminution steps, undesirably large amounts of polymeric particles with too low a particle size ("fines") may be obtained. The solids content of the gel before the drying is preferably from 25% to 90% by weight, more preferably from 35% to 70% by weight and most preferably from 40% to 60% by weight. However, a fluidized bed dryer or a paddle dryer may optionally also be used for drying purposes.

Thereafter, the dried polymer gel is preferably ground and classified, and the apparatus used for grinding may typically be single or multistage roll mills, preferably two- or three-stage roll mills, cutting mill, ultra centrifugal mill, pin mills, hammer mills or vibratory mills.

The median particle size of the polymeric particles removed as the product fraction is preferably at least 200 µm, more preferably from 250 to 600 µm and very particularly from 300 to 500 µm. The median particle size of the product fraction may be determined by means of EDANA (European Disposables and Nonwovens Association) recommended test method No. WSP 220.2-05 "Particle Size Distribution", where the proportions by mass of the screen fractions are plotted in cumulated form and the median particle size is determined graphically. The median particle size here is the mesh size value at which a cumulative 50% by weight is found.

The proportion of particles having a particle size of at least 150 µm is preferably at least 90% by weight, more preferably at least 95% by weight, most preferably at least 98% by weight.

Polymeric particles having too low a particle size lower the permeability. Therefore, the proportion of excessively small polymeric particles ("fines") should be small. Excessively small polymeric particles are therefore typically separated off and recycled into the process. This is preferably done before, during or immediately after the polymerization, i.e. before the drying of the polymer gel. The excessively small polymeric particles can be moistened with water and/or aqueous surfactant before or during the recycling.

It is also possible to remove excessively small polymeric particles in later process steps, for example after the surface postcrosslinking or another coating step. In this case, the excessively small polymeric particles recycled are surface postcrosslinked or coated in another way, for example with fumed silica.

If a kneading reactor is used for polymerization, the excessively small polymeric particles are preferably added during the last third of the polymerization.

If the excessively small polymeric particles are added at a very early stage, for example actually to the monomer solution, this lowers the centrifuge retention capacity (CRC) of the resulting water-absorbing polymeric particles. However, this can be compensated, for example, by adjusting the amount of crosslinker b) used.

If the excessively small polymeric particles are added at a very late stage, for example not until an apparatus connected downstream of the polymerization reactor, for example an extruder, the excessively small polymeric particles can be incorporated into the resulting polymer gel only with difficulty. Insufficiently incorporated, excessively small polymeric particles are, however, detached again from the dried polymer gel during the grinding, are therefore removed again in the course of classification and increase the amount of excessively small polymeric particles to be recycled.

The proportion of particles having a particle size of at most 850 µm is preferably at least 90% by weight, more preferably at least 95% by weight, most preferably at least 98% by weight.

Polymeric particles having too high a particle size lower the free swell rate. Therefore, the proportion of excessively large polymeric particles should likewise be small. Excessively large polymeric particles are therefore typically separated off and recycled into the grinding of the dried polymer gel.

To further improve the properties, the polymeric particles can be surface postcrosslinked, which is very particularly preferable for the purposes of the present invention.

Suitable surface postcrosslinkers are in particular compounds which comprise groups which can form covalent bonds with at least two carboxylate groups of the polymeric particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230. Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amido acetals in DE 103 34 584 A1, oxetanes and cyclic ureas in EP 1 199 327 A2 and morpholine-2,3-dione and derivatives thereof in WO 2003/031482 A1. Preferred surface postcrosslinkers are ethylene carbonate, ethylene glycol diglycidyl ether, reaction products of polyamides with epichlorohydrin and mixtures of propylene glycol and 1,4-butanediol. Very particularly preferred surface postcrosslinkers are ethylene carbonate, 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001% to 2% by weight, more preferably 0.02% to 1% by weight and most preferably 0.05% to 0.2% by weight, based in each case on the polymeric particles.

The surface postcrosslinker is admixed to the polymeric particles, corresponding to base polymer A, in particular by means of an aqueous additive solution B in accordance with this invention via a pipe without nozzle.

In a further preferred embodiment of the present invention, polyvalent cations are applied to the particle surface in particular in addition to the surface postcrosslinkers before, during and/or after the surface postcrosslinking. The polyvalent cations usable are, for example, divalent cations such as the cations of zinc, magnesium, calcium and strontium, trivalent cations such as the cations of aluminum, tetravalent cations such as the cations of titanium and zirconium. Possible counterions are, for example, chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations. The amount of polyvalent cation used is, for example, 0.001% to 1.5% by weight, preferably 0.005% to 1% by weight and more preferably 0.02% to 0.8% by weight, based in each case on the polymeric particles. The polyvalent cations are admixed to the polymeric particles, corresponding to base polymer A, in particular by means of a liquid additive preparation B, in particular an aqueous additive solution B, in accordance with this invention via a pipe without nozzle.

The surface postcrosslinking is typically performed by applying a solution of the surface postcrosslinker to the dried polymeric particles, in particular by means of a liquid additive preparation B, in particular an aqueous additive solution B, in accordance with this invention via a pipe without nozzle. Thereafter, the polymeric particles coated with surface postcrosslinker are preferably dried thermally, while the surface-postcrosslinking reaction can take place not only before but also during drying.

Applying a solution of the surface postcrosslinker may preferably be carried out in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers have a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). But it is also possible for the surface-postcrosslinker solution to be applied in a fluidized bed, in particular in accordance with this invention.

The surface postcrosslinkers are used in the form of an aqueous solution in particular. It is possible to adjust the penetration depth of the surface postcrosslinker into the polymeric particles via the content of nonaqueous solvent or total amount of solvent.

The term "aqueous solution" herein comprehends any liquid preparation having a minimum water content of 5% by weight, preferably ≥10% by weight, especially ≥50% by weight, based on the preparation.

When exclusively water is used as the solvent, a surfactant is advantageously added. This improves the wetting characteristics and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The preferred thermal drying is preferably carried out in contact dryers, more preferably paddle dryers, most preferably disk dryers. Suitable dryers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed dryers may also be used. The drying can be effected in the mixer itself, by heating the jacket or blowing in warm air. Equally suitable is a downstream dyer, for example a shelf dryer, a rotary tube oven or a heatable screw. It is particularly advantageous to effect mixing and drying in a fluidized bed dryer.

Preferred drying temperatures are, for example, in the range of 80 to 250° C., preferably 120 to 220° C., more preferably 130 to 210° C. and most preferably 150 to 200° C. The preferred residence time at this temperature in the reaction mixer or dryer is preferably at least 10 minutes, more preferably at least 20 minutes, most preferably at least 30 minutes, and typically at most 60 minutes.

Subsequently, the surface-postcrosslinked polymeric particles can be classified again, with removal of excessively small and/or excessively large polymeric particles and recycling into the process.

The preferably surface-postcrosslinked polymeric particles may be posttreated to further improve their properties, preferably by posttreatment, in particular coating and/or remoistening, with a posttreating agent. This posttreatment in a further preferred embodiment of the invention can also be carried out using a liquid additive preparation B, in particular an aqueous additive solution B, in accordance with this invention, via a pipe without nozzle.

The optional remoisturizing is preferably performed at 30 to 80° C., more preferably at 35 to 70° C., most preferably at 40 to 60° C. At excessively low temperatures, the water-absorbing polymeric particles tend to form lumps, and, at higher temperatures, water already evaporates to a noticeable degree. The amount of water used for optional remoisturizing is preferably from 1 to 10% by weight, more preferably from 2 to 8% by weight and most preferably from 3 to 5% by weight. The optional remoisturizing increases the mechanical stability of the polymeric particles and reduces their tendency to static charging. Suitable optional coatings for improving the free swell rate and permeability (SFC) are, for example, inorganic inert substances, such as water-insoluble metal salts, organic polymers, cationic polymers and di- or polyvalent metal cations. Suitable optional coatings for dust binding are, for example, polyols. Suitable optional coatings for counteracting the undesired caking tendency of the polymeric particles are, for example, fumed silica, such as Aerosil® 200, and surfactants, such as Span® 20.

Preferred water-absorbing polymeric particles have a moisture content of preferably 1 to 15% by weight, more preferably 2 to 10% by weight and most preferably 3 to 5% by weight, the moisture content being determined by EDANA (European Disposables and Nonwovens Association) recommended test method No. WSP 230.2-05 "Moisture Content".

The water-absorbing polymeric particles advantageously resulting in this invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the water-absorbing polymeric particles advantageously resulting in this invention is typically less than 60 g/g. The centrifuge retention capacity (CRC) is determined by EDANA (European Disposables and Nonwovens Association) recommended test method No. WSP 241.3-10 "Centrifuge Retention Capacity". The water-absorbing polymeric particles advantageously resulting in the context of this invention have an absorption under a pressure of 49.2 g/cm$^2$ (0.7 psi) of typically at least 15 g/g, preferably at least 20 g/g, more preferably at least 22 g/g, especially preferably at least 23.5 g/g and most preferably at least 25 g/g. The absorption under a pressure of 49.2 g/cm² (0.7 psi) of the water-absorbing polymeric particles is typically less than 35 g/g. Absorption Against Pressure (AAP), specifically against a pressure of 49.2 g/cm² (0.7 psi), is determined in accordance with EDANA method No. WSP242.3-10.

It has further proved advantageous when, in a preferred embodiment of the invention, the iron ion content of the monomer solution or suspension is below 5 ppm, preferably below 3 ppm and more preferably below 1 ppm.

In the context of the present invention, two or more liquid additive preparations B, in particular aqueous additive solutions B, for example designated as additive solutions $B^I$, $B^{II}$, $B^{III}$, $B^{IV}$, etc. may be added to varying base polymer A, for example designated as base polymer $A^I$, $A^{II}$, $A^{III}$, $A^{IV}$, etc. For example, in one preferred process of the present invention, additive solutions $B^I$ and/or $B^{II}$ are added to base polymer A in the course of a surface-postcrosslinking operation, the result then being a surface-postcrosslinked polymer designated base polymer $A^I$ for example. In the further course of the same preferred process, additive solutions $B^{III}$ and/or $B^{IV}$, for example, may then be additionally added to the base polymer $A^I$ in the course of the posttreatment.

The liquid additive preparation B, in particular the aqueous additive solution B, may in principle comprise any additives and added-substance materials which are usable in the production and posttreatment of water-absorbing polymers. These may be in particular surface postcrosslinkers, metal salts, particularly comprising polyvalent cations, film-forming polymers, thermoplastic polymers, dendrimers, polycationic polymers (such as preferably polyvinylamine, polyethyleneimine or polyallylamine), water-insoluble polyvalent metal salts, such as preferably magnesium carbonate, magnesium oxide, magnesium hydroxide, calcium carbonate, calcium sulfate or calcium phosphate, water-soluble mono- or polyvalent metal salts, such as preferably aluminum sulfate, salts of sodium, of potassium, of zirconium or of iron, inorganic particles, such as preferably pyrogenous alumina, clay minerals, pyrogenous silica, colloidal silica sols, titanium dioxide, nonpyrogenous alumina and magnesia, alkali metal salts, such as preferably sodium sulfate, potassium sulfate, sodium lactate, potassium lactate, sodium citrate, potassium citrate, sodium sorbate and potassium sorbate, dustproofing agents, such as preferably polyethylene glycols having a molecular weight of for example 400 to 10 000 g/mol, polyglycerol, 3- to 100-tuply ethoxylated polyols, such as preferably trimethylolpropane, glycerol, sorbitol and neopentylglycol, odor control agents, e.g., zeolites, cyclodextrins, antimicrobial actives and/or scents.

In one preferred embodiment of the invention, the liquid additive preparation B, in particular the aqueous additive solution B, to be designated as aqueous additive solution $B^I$ for example, is produced by mixing a first additive-containing liquid I, preferably an aqueous additive-containing solution I, preferably comprising at least one surface postcrosslinker, with at least one second additive-containing liquid II, preferably an additive-containing aqueous solution II, preferably comprising a polyvalent cation, wherein the liquids I and II are fed separately to the pipe and are only combined and mixed in the pipe, so what emerges from the pipe is a mixture of liquids I and II as liquid additive preparation B, in particular aqueous additive solution B, here designated as aqueous additive solution $B^I$. In this preferred embodiment of the invention, therefore, the aqueous additive solution B, here designated as aqueous additive solution $B^I$, comprises the mixture of at least two aqueous additive-containing solutions. The mixing of the aqueous additive-containing solutions only takes place in the pipe, for example in a T piece or distributor, so what emerges from the pipe is a mixture of solutions I and II as aqueous additive solution B, here designated as aqueous additive solution $B^I$.

The first liquid I, preferably the aqueous additive-containing solution I, may comprise any additives and added-substance materials, and preferably comprises at least one surface postcrosslinker. It more particularly does not comprise any polyvalent cations.

The second liquid II, preferably the aqueous additive-containing solution II, may likewise comprise any additives and added-substance materials, preferably it comprises a polyvalent cation. It more particularly does not comprise any surface postcrosslinker of liquid I.

In a further preferred embodiment of the invention, further liquids, in particular aqueous solutions, may be dosed via the pipe into the mixing device and onto the base polymer A, wherein these liquids are also fed separately into the pipe and are only combined in the pipe with liquids I and II or their mixture, so what emerges from the pipe is a mixture of all employed liquids as liquid additive preparation B, in particular aqueous additive solution B.

In a further preferred embodiment of the invention, liquids I and II and also any further liquids present are combined/mixed in the pipe via one or more T pieces or distributors to form the liquid additive preparation B, in particular the aqueous additive solution B.

The exit orifice of the pipe in a further preferred embodiment of the invention may be circular, oval or quadrangular.

In a further preferred embodiment of the invention, the internal diameter of the pipe at the point of exit is in the range of 1 mm-50 mm, e.g. 2 mm-40 mm, advantageously 3 mm-30 mm, preferably 5 mm to 25, in particular 10 to 20 mm.

More particularly, the entire length of the pipe has essentially an internal diameter of 1 mm-50 mm, for example from 10 to 50 mm. The entire length of the pipe to the point of injection into the mixing device may be for example from 20 cm to 10 m, e.g. from 0.5 m to 5 m or e.g. from 1 m to 3 m, preferably resulting from simple conveniency-directed considerations for the particular specific plant. A person skilled in the art is readily able to determine a suitable length for the pipe in a few range-finding tests.

When the pipe section in which the liquids, in particular solutions, to be added are combined and the exit orifice have essentially the same diameter, this amounts again to a further preferred embodiment of the invention, although it is preferable for the pipe to taper in the direction of the exit orifice.

The exit orifice of the pipe may preferably be horizontal or vertical, in which case the vertical exit orifice in particular is preferable. More particularly, the exit orifice of the pipe points down, preferably vertically down.

In one preferred embodiment of the invention, the time span between combining the liquids, in particular solutions, e.g., solutions I and II, to be added and the emergence of the mixture which is the liquid additive preparation B, in particular the aqueous additive solution B, from the pipe is at least 1 second and less than 60 seconds, preferably less than 30 seconds. The liquids to be added are liquids which combine in the pipe to produce additive solution B.

The amount of liquid additive preparation B, in particular aqueous additive solution B, is preferably between 0.1 to 10% by weight, based on base polymer A.

Base polymer A is preferably a partially neutralized crosslinked polyacrylic acid, for example to be designated as base polymer $A^I$.

In a further preferred embodiment of the invention, the admixture of liquid additive preparation B, in particular aqueous additive solution B, to the base polymer A is followed by thermal drying of the polymer, wherein a surface-postcrosslinking reaction takes place which may take place not only before but also during drying, wherein the preferred temperature range for surface postcrosslinking and drying ranges from ≥65° C. to 200° C., in particular from 100 to 200° C. and more preferably from 150 to 190° C.

In a further preferred embodiment of the invention, base polymer A is a partially neutralized surface-postcrosslinked polyacrylic acid, for example to be designated as base polymer $A^{II}$. In a further preferred embodiment of the invention, as the liquid additive preparation B, in particular the aqueous additive solution B, is admixed to the base polymer A, just designated as base polymer $A^{II}$, the surface-postcrosslinked polymer is being cooled, preferably to a temperature <65° C., in particular <50° C., and the moisture content of the polymer is being raised, preferably to 10% by weight, preferably to from 0.01 to 5% by weight and more preferably to from 0.1 to 3% by weight, as measured by Karl Fischer titration.

In a further preferred embodiment of this invention, at least 80% by weight of base polymer A has a particle size between 150 and 850 μm, in particular between 150 and 600 μm.

In a further preferred embodiment of the invention, the liquid additive preparation B, in particular the aqueous additive solution B, comprises such additive materials which alter the performance properties of base polymer A in a desired direction and/or facilitate its processability or endow the resultant polymer with an additional function. Additive materials of this type include, for example, aluminum salts, e.g., aluminum sulfate or aluminum lactate. The choice of additive materials is not crucial in that a person skilled in the art may recur to the entirety of additive materials known to him or her. Suitable additive materials are preferably selected from surface postcrosslinkers, metal salts, particularly comprising polyvalent cations, film-forming polymers, thermoplastic polymers, dendrimers, polycationic polymers (such as preferably polyvinylamine, polyethyleneimine or polyallylamine), water-insoluble polyvalent metal salts, such as preferably magnesium carbonate, magnesium oxide, magnesium hydroxide, calcium carbonate, calcium sulfate or calcium phosphate, water-soluble mono or polyvalent metal salts, such as preferably aluminum sulfate, salts of sodium, of potassium, of zirconium or of iron, inorganic particles, such as preferably pyrogenous alumina, clay minerals, pyrogenous silica, colloidal silica sols, titanium dioxide, nonpyrogenous alumina and magnesia, alkali metal salts, such as preferably sodium sulfate, potassium sulfate, sodium lactate, potassium lactate, sodium citrate, potassium citrate, sodium sorbate and potassium sorbate, dustproofing agents, such as preferably polyethylene glycols having a molecular weight of for example 400 to 20 000 g/mol, polyglycerol, 3 to 100 tuply ethoxylated polyols, such as preferably trimethylolpropane, glycerol, sorbitol and neopentylglycol, odor control agents, e.g., zeolites, cyclodextrins, antimicrobial actives and/or scents.

An immense advantage of the present invention is that it even makes possible the simple admixture of mutually incompatible additives, since the process can be engineered such that they meet at the earliest in the pipe and this only for a very short time, e.g. for a few seconds.

It may be more particularly preferable in this invention for additive materials to be admixed in the course of the production process to be introduced into the pipe strictly separately via at least two, preferably three separate liquids, in particular aqueous solutions, so the liquid additive preparation B, in particular the aqueous additive solution B, is only formed in the pipe. This corresponds to a preferred embodiment of the invention. It serves to prevent any possible separation of the liquid additive preparation B, since the latter is only formed in the process itself and further processed at once.

In a further preferred embodiment of the invention, the path length from where the liquids, in particular solutions, to be added are combined to where the mixture which is the liquid additive preparation B, in particular the aqueous additive solution B, emerges from the pipe is less than 2 m, preferably less than 1 m.

In a further preferred embodiment of the invention, the liquid additive preparation B, in particular the aqueous additive solution B, impinges from the exit orifice of the pipe onto base polymer A in one coherent stream or, in particular, in a dribble.

The liquid additive preparation B, in particular the aqueous additive solution B, preferably has a water content ≥10% by weight, for example ≥30% by weight or ≥40% by weight, advantageously of at least 50% by weight, advantageously of at least 60% by weight or 70% by weight, more advantageously of at least 80% by weight, preferably of at least 90% by weight. There may be an upper limit to water at 99% by weight for example. The additive content (without water) of the aqueous additive solution B may be for example ≥0.01% by weight to 90% by weight, for example from 1% by weight to 50% by weight, e.g. from 5% by weight to 20% by weight.

The temperature of the liquid additive preparation B, in particular of the aqueous additive solution B, on emerging from the exit orifice may be in particular at least 10° C., advantageously 30° C., preferably at least 40° C.

The invention comprehends the possibility of liquid additive preparations being introduced into the mixing device via two or more separate pipes.

The present invention further provides a water-absorbing polymer obtainable by a process as described above.

In one preferred embodiment of the invention, the water-absorbing polymeric particles of the present invention have (a) a Centrifuge Retention Capacity (CRC) of at least 30 g/g, (b) an Absorption Against Pressure (AAP 0.7 psi) of at least 20 g/g.

In a further preferred embodiment of the invention, in the case of the water-absorbing polymeric particles of the present invention, the proportion of particles having a particle size of at least 150 μm is at least 90% by weight, more preferably at least 95% by weight, most preferably at least 98% by weight, and the proportion of particles having a particle size of at most 850 μm is preferably at least 90% by weight, more preferably at least 95% by weight, most preferably at least 98% by weight.

The present invention makes possible the provision of articles comprising water-absorbing polymeric particles. The invention thus further provides an article, in particular a liquid-imbibing hygiene article, comprising water-absorbing polymeric particles of the present invention.

Preferred articles of this type include, for example, any incontinence aids, such as, in particular, diapers and also hygiene articles, such as, in particular, sanitary napkins and tampons.

EXAMPLE

The process according to the invention can in principle be implemented in all existing processes, especially industrial scale processes, for superabsorbent production.

General Production Process 300 kg of acrylic acid were mixed with 429.1 kg of $H_2O$, 1.2 kg allyloxy polyethylene glycol acrylate and 1.2 kg of polyethyleneglycol-300 diacrylate, and the mixture was cooled to 10° C. Thereafter, a total of 233.1 kg of 50% sodium hydroxide solution were added while cooling, at a sufficiently slow rate that the temperature did not exceed 30° C. Subsequently, the solution was purged with nitrogen at 20° C. and cooled down further in the process. On attainment of the start temperature of 4° C., the initiator solutions (0.1 kg of 2,2'-azobis-2-amidinopropane dihydrochloride in 10 kg of $H_2O$; 0.15 kg of sodium peroxydisulfate in 10 kg of $H_2O$; 0.1 kg of 30% hydrogen peroxide solution in 1 kg of $H_2O$ and 0.01 kg of ascorbic acid in 2 kg of water) were added. The polymerization was conducted on a continuous belt with a residence time of about 40 minutes.

The resultant gel was comminuted and dried at 150-180° C. for 60 minutes. The dried polymer was crushed coarsely, ground and screened continuously to give a powder having a particle size of 150 to 850 μm.

This fraction, hereinafter also referred to as base polymer, was for surface postcrosslinking continuously admixed in a mixer with additives, as hereinbelow indicated, for surface crosslinking and heated in a paddle dryer to 180° C. (residence time about 40 min).

The product thus obtained was cooled down and then classified again, and the fraction having a particle size of 150 to 850 μm was regarded as the end product of the process.

Surface Crosslinking

In the production process described above, a liquid additive preparation was applied to the polymer, referred to as base polymer, for surface crosslinking.

Version a

In version a, the present invention was applied in the context of surface crosslinking, i.e. an aqueous additive solution B was dosed via a pipe without nozzle into the mixing device and onto the base polymer.

Provided to this end were a first solution I comprising 2.5% by weight of 2 oxazolidinone, 28% by weight of isopropanol, 2.5% by weight of 1,2 propanediol, 0.7% by weight of sorbitan monococoate and 66.3% by weight of water, and also a second solution II comprising 27% by weight of aluminum sulfate in water.

Solutions I and II were fed to the pipe strictly separately and only combined with each other in the pipe, so what emerged from the pipe was a mixture of employed solutions I and II as aqueous additive preparation B. Solutions I and II were used in an amount based on the polymer of 3.5% by weight and 1.59% by weight, respectively.

Version a led in the context of the general production process to end product a.

Version b

Version b applied the customary procedure, i.e. abovementioned solutions I and II were mixed together in a container and formed an aqueous additive solution for surface crosslinking. This aqueous additive solution was conventionally sprayed onto the base polymer by means of a nozzle in a mixer for surface crosslinking. Version b led in the context of the general production process to end product b.

Version b solely differed from version a in the mode of applying the aqueous additive solution.

Result:

The production process according to version a made possible a trouble-free admixture of the liquid additive preparation in the manufacture of water-absorbing polymeric particles. Product quality was not compromised despite eschewing the use of nozzles to spray dispense the liquid additive preparations. Version b, by contrast, resulted in mixer blockage.

The invention claimed is:

1. A process for producing water-absorbing polymers, which comprises contacting and mixing a base polymer A with a liquid additive preparation B, in a mixing device, wherein the base polymer A is formed from monomers bearing at least 30% neutralized acid groups and the liquid additive preparation B is formed by mixing a first liquid I, with at least one second liquid II, wherein the first liquid I and second liquid II are fed separately to a pipe where they are combined and mixed inside the pipe, and emerging from the pipe as liquid additive preparation B, which is dosed into the mixing device without nozzle.

2. The process according to claim 1, wherein additional liquids are added via the pipe into the mixing device and onto the base polymer A, wherein the additional liquids are also fed separately into the pipe and are combined in the pipe with liquids I and II or their mixture, so what emerges from the pipe is a mixture of all liquids as liquid additive preparation B.

3. The process according to claim 1, wherein liquids I and II and also any further liquids present are combined/mixed in the pipe via one or more T pieces or distributors to form the liquid additive preparation B.

4. The process according to claim 1, wherein the internal diameter of the pipe is in the range of 1-50 mm.

5. The process according to claim 1, wherein the time span between combining the first liquid I and the at least one second liquid II to be added and the emergence of the mixture which is the liquid additive preparation B from the pipe is less than 60 seconds.

6. The process according to claim 1, wherein the base polymer A is a partially neutralized crosslinked polyacrylic acid.

7. The process according to claim 6, wherein the admixture of liquid additive preparation B to the base polymer A is followed by thermal drying of the polymer.

8. The process according to claim 1, wherein the base polymer A is a partially neutralized surface-postcrosslinked polyacrylic acid, the postcrosslinking step occurring after the base polymer A has been contacted and mixed with the liquid preparation B.

9. The process according to claim 8, wherein as the liquid additive preparation B is admixed to the base polymer A, the temperature of the surface-postcrosslinked polymer is cooled to a temperature of <65° C. and the moisture content of the polymer is raised to 10% by weight of base polymer A as determined by Karl Fischer titration.

10. The process according to claim 1, wherein at least 80% by weight of base polymer A has a particle size between 150 and 850 μm.

11. The process according to claim 1, wherein the path length from where the liquids to be added are combined to where the mixture which is the liquid additive preparation B emerges from the pipe is less than 2 m.

12. The process according to claim 1, wherein the liquid additive preparation B has a water content of at least 50% by weight.

13. The process of claim 7 wherein a surface-postcrosslinking reaction takes place before and during drying.

14. The process of claim 13 wherein the temperature range for surface postcrosslinking and drying ranges from 65° C. to 200° C.

* * * * *